Patented Apr. 4, 1944

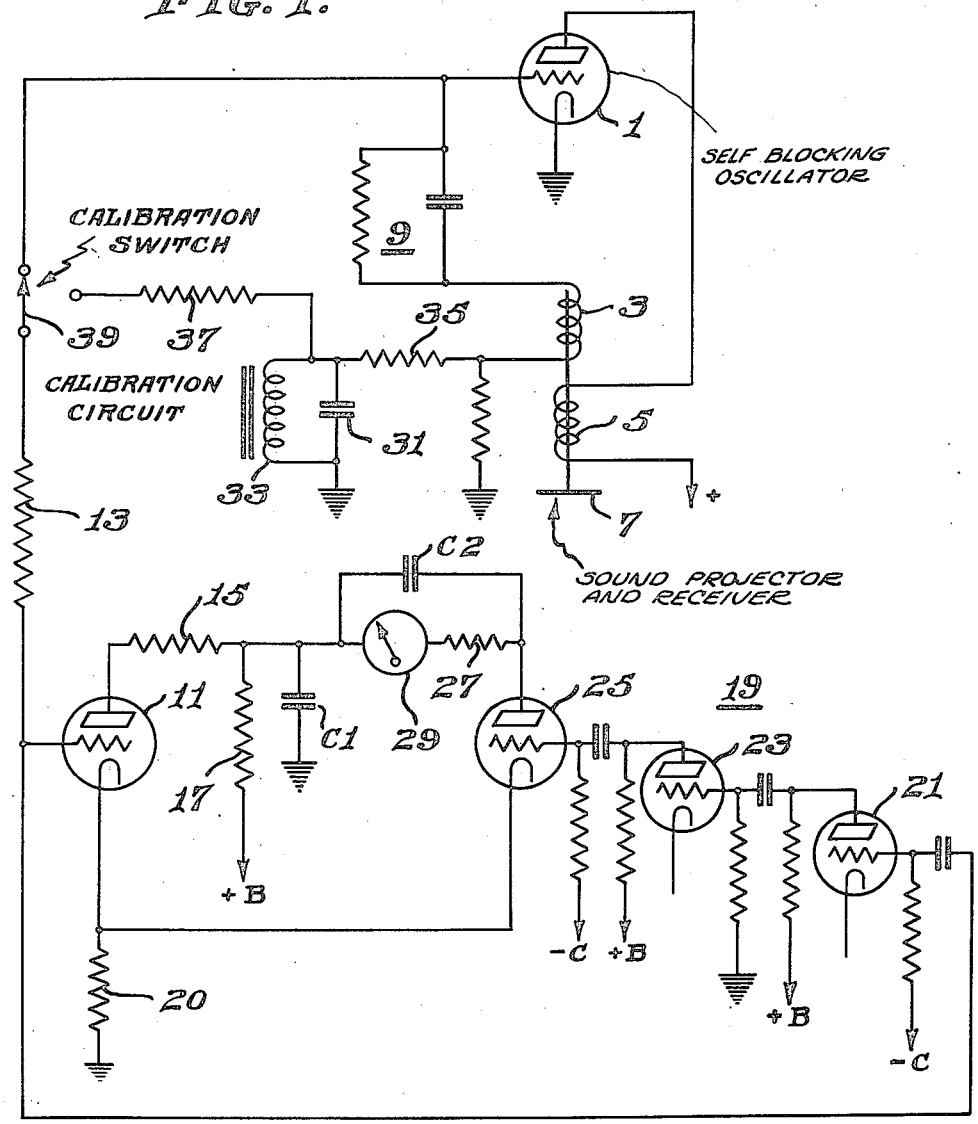

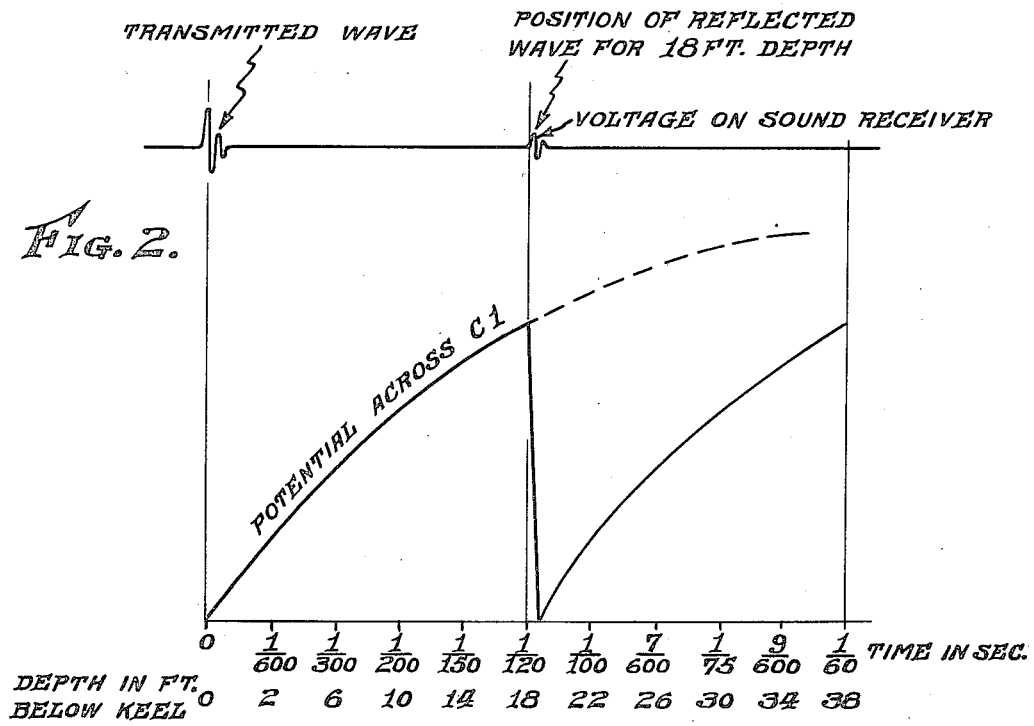
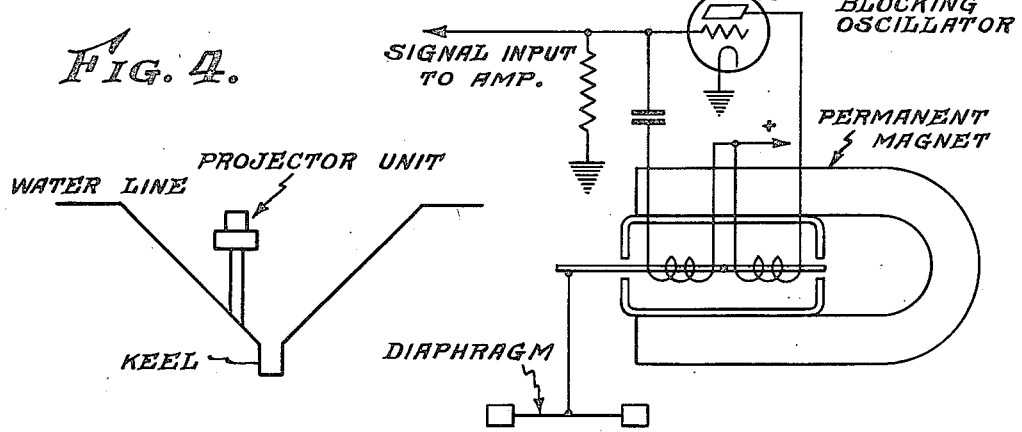

2,346,093

UNITED STATES PATENT OFFICE 2,346,093

SONIC DEPTH INDICATOR

William A. Tolson, Westmont, N. J., assignor to Radio Corporation of America, a corporation of Delaware Application October 22, 1941, Serial No. 416,031

5 Claims. (Cl. 177—386)

This invention relates to improvements in sonic distance indicators and particularly to a sonic distance or depth measuring device in which the time for a pulse to travel to and from a reflecting object controls the charge and discharge of a capacitor and in which the distance is indicated as a function of said discharge.

Sonic distance measuring devices which measure the propagation time required for a pulse to travel to a pulse reflecting object and back to a receiver are usually expensive and complicated. Part of the expense is represented by an elaborate indicator in which the pointer or reference mark is moved at constant speed in the manner of a stop watch. Part of the complication comes from the means employed for synchronizing the radiation of the pulse with the zero of the indicator. While the prior art sonic distance indicators have been suitable for the larger vessels, they have been too heavy, complicated and expensive for smaller vessels.

Among the objects of the instant invention are (1) the provision of improved means for indicating distances by means of sonic pulses; (2) the provision of an improved sonic distance indicator in which the pulse synchronization and distance timing are effected by charging and discharging a capacitor; and (3) the provision of means including a blocking oscillator and a sound projector for radiating pulses and for controlling the charging of a capacitor and for discharging the capacitor to indicate the propagation time of the pulses.

The invention will be described by referring to the accompanying drawings, in which Fig. 1 is a schematic circuit diagram of one embodiment of the invention; Fig. 2 is a graph showing the charge and discharge of the time indicating capacitor C1 of Fig. 1; Fig. 3 is a schematic diagram of the blocking oscillator and sound projector of Fig. 1; and Fig. 4 is a diagrammatic showing of a sound projector attached to the hull of a vessel.

Referring to Fig. 1, there is shown a self blocking oscillator which includes a tube and the field coils 3, 5 of a sound projector. The diaphragm 7 of the sound projector is secured to the hull of the vessel so that sonic pulses may be radiated toward the bottom of the ocean or toward an object to be detected. The oscillator also includes the conventional capacitor-resistor network 9 and a connection to the grid of a control tube 11. The connection to the control tube 11 includes a resistor 13 which prevents overloading. The control tube is normally biased to cut-off. The anode circuit of the control tube includes resistors 15, 17. A timing capacitor C1 is shunted across the resistor 17.

The sound projector 3, 5, 7, which also acts as a sound responsive device, is connected to the input of an amplifier 19. The amplifier may include several thermionic tubes 21, 23, 25, which have an overall gain materially greater than the control tube 11. The output of the amplifier is connected through a resistor 27 and an indicating meter 29 to the timing capacitor C1. The meter connection terminates in the control tube anode circuit from which the anode current for the amplifier output tube is derived. The amplifier output tube 25 is normally biased to cut-off by a potential from a C voltage source. The indicating meter 29 and resistor 27 may be shunted by a capacitor C2 which provides a means for controlling the time constant or damping of the indicator.

The device preferably includes a calibrating circuit. The calibrating circuit includes a capacitor 31 and an inductor 33 which are tuned to a frequency corresponding to a predetermined distance. The calibrating circuit 31—33 is connected through an isolating resistor 35 to the blocking oscillator and may also be connected, through a second isolating resistor 37 and calibration switch 39, to the control tube 11 and receiver amplifier 19.

The operation of the device is as follows: The blocking oscillator 1 applies a current pulse to the field coils 3, 5 of the sound projector which radiates a discrete sonic pulse or wave. The pulse is also applied positively to the control tube grid. This unblocks the control tube and permits current to flow through the resistor 15 and capacitor C1 to ground to discharge the capacitor C1, whereupon the capacitor C1 starts to charge up again through the resistor 17, as indicated by the rising curve of Fig. 2. The controlling pulse also actuates the amplifier 19, but the time constant of the amplifier is made long enough to prevent the amplifier output from interfering with the initial discharge of the capacitor C1. Furthermore, an additional bias for the amplifier output tube is derived from the resistor 20 in the control tube circuit.

In the meantime, the radiated pulse travels toward the bottom or other reflecting object, and after reflection establishes a voltage in the sound receiver 3, 5, 7. The received voltage pulse, being very much smaller than the transmitted voltage pulse, will not affect the control tube 11 but will be amplified sufficiently to unblock the amplifier output tube 25. When the output tube is unblocked, current will flow through the meter and the timing capacitor will be discharged. The amplitude of the discharging current depends upon the time elapsing between the transmission or radiation of the wave and the reception of the reflected wave as indicated in Fig. 2. It should be understood that the cycle repeats when the blocking oscillator again energizes the sound projector and initially discharges the timing capacitor.

The indicating meter 29 may be calibrated in terms of distance. The calibration will be logarithmic so that the readings will be increasingly crowded for the longer distances and increasingly spaced for the shorter distances. This type of scale is desirable in the depth indicator because shallow water will be indicated with greater accuracy than deep water, in which a high degree of accuracy is usually not required.

Inasmuch as the calibration will be affected by variations in the supply voltages, changes in the tube characteristics, and unavoidable variations in circuit elements, a convenient calibrating means is highly desirable. In the arrangement shown in Fig. 1, the calibrating voltage is derived from the tuned circuit. The tuned circuit is adjusted so that its time constant corresponds to the maximum distance to be measured or to any desired distance, such as the zero which corresponds to the time required for the pulse to travel from the projector to the keel and return.

Thus, the invention has been described as a sonic distance indicator in which a blocking oscillator controls the transmission of a sonic pulse and the charging of a timing capacitor. The received, reflected pulse, after amplification, is used to control the second discharge of the capacitor. The resulting discharging current, which flows through the distance indicator, is a measure of the propagation time of the pulse and hence the distance of the reflecting object. The field coils of the sound projector and receiver may be used as the oscillation transformer of the blocking oscillator, or the elements of the oscillator and the projector may be separated.

I claim as my invention:

1. A sonic distance indicator including a combined sound projector and sound receiver device adapted to project pulses toward a pulse reflecting object whose distance from said device is to be indicated and also adapted to be actuated by pulses reflected back thereto by said object, a self blocking oscillator connected to said device for applying a discrete pulse of current thereto whereby to cause said device to radiate a pulse toward said object, said oscillator having a self blocking time which is longer than the time required for said radiated pulse to travel from said device to said object and thence back to said device, an initially charged capacitor, means connecting said oscillator to said capacitor for discharging said capacitor in synchronism with the radiation of said pulse and for starting recharging of said capacitor, and means including a current measuring indicator connected between said capacitor and said device and responsive to the reflected pulse received by said device to provide a current measuring discharge path for said capacitor effective to indicate the distance between said reflecting object and said device as a function of the charge on said capacitor resulting from said recharging.

2. A sonic distance indicator including a reversible electroacoustical converting device, a self blocking oscillator connected to said device for applying a discrete pulse of current to said device to radiate said pulse toward a reflecting object, said oscillator having a self blocking time which is longer than the time required for said radiated pulse to travel from said device to said object and thence back to said device, a capacitor, means connecting said capacitor to said oscillator for discharging and initiating the recharging of said capacitor in synchronism with the application of said discrete pulse, means including said device for discharging said capacitor upon reception of said pulse after its reflection, and means connected between said capacitor and said discharging means for indicating the distance of said reflecting object as a function of said last named discharge.

3. A sonic distance indicator including a reversible electroacoustical converting device, an oscillator connected to said device, means including said oscillator for applying periodically discrete pulses to said projector, a timing capacitor, a thermionic control tube connected to said device and to said capacitor for synchronizing the initial discharge and the starting of the recharging of said capacitor with the application of said pulses, a thermionic amplifier connected to said device and having a greater gain than said control tube, and an indicating meter connected between said capacitor and the output of said amplifier for discharging said capacitor through said output and for indicating the discharge current of said timing capacitor.

4. A sonic distance indicator including a reversible electroacoustical converting device, an oscillator connected to said device, means including said oscillator for applying periodically discrete pulses to said projector, a timing capacitor, a thermionic control tube connected to said device and to said capacitor for synchronizing the initial discharge and the starting of the recharging of said capacitor with the application of said pulses, a thermionic amplifier connected to said device and having a greater gain than said control tube, and means including a meter connected between the output of said amplifier and said timing capacitor for discharging said capacitor through said output upon reception of a reflected pulse.

5. In a sonic distance indicator, the combination of a reversible electroacoustical converting device, a self blocking oscillator associated with said device for applying a discrete pulse of current thereto to cause said device to radiate said pulse toward a pulse reflecting object, said oscillator having a self blocking time which is longer than the time required for said radiated pulse to travel from said device to said object and thence back to said device, a thermionic control tube coupled to said oscillator whereby said oscillator is also adapted to apply said pulse to said control tube, said control tube being normally blocked and being unblocked upon application of said pulse thereto, a normally charged timing capacitor connected in the output circuit of said control tube, the unblocking of said control tube causing said capacitor to become discharged, means for thereafter recharging said capacitor, a thermionic amplifier connected to said device and having a greater gain than said control tube, and means including an indicating meter connected between said capacitor and the output of said amplifier, said amplifier being adapted to be actuated in response to the reflected pulse picked up by said device, and said last named means being adapted to effect discharge of said capacitor through said amplifier output and to indicate the discharge current of said timing capacitor.

WILLIAM A. TOLSON.